United States Patent [19]
Tucker et al.

[11] Patent Number: 5,903,313
[45] Date of Patent: May 11, 1999

[54] METHOD AND APPARATUS FOR ADAPTIVELY PERFORMING MOTION COMPENSATION IN A VIDEO PROCESSING APPARATUS

[75] Inventors: Michael R. Tucker; Geoffrey S. Strongin; Yi Liu, all of Austin, Tex.

[73] Assignee: Advanced Micro Devices, Inc., Sunnyvale, Calif.

[21] Appl. No.: 08/424,019

[22] Filed: Apr. 18, 1995

[51] Int. Cl.⁶ .................................................. H04N 7/18
[52] U.S. Cl. ........................ 348/416; 348/415; 348/411; 348/412; 348/699; 348/720; 348/384
[58] Field of Search .................................. 348/699, 416, 348/402, 415, 411, 412, 390, 384, 720; 382/17; 364/265.2, 264.4, 557, 558

[56] References Cited

U.S. PATENT DOCUMENTS

| | | | |
|---|---|---|---|
| 5,150,210 | 9/1992 | Hoshi et al. | 348/402 |
| 5,164,828 | 11/1992 | Tahara et al. | 348/412 |
| 5,247,363 | 9/1993 | Sun et al. | 348/412 |
| 5,287,420 | 2/1994 | Barrett | 382/56 |
| 5,315,670 | 5/1994 | Shapiro | 382/56 |
| 5,329,318 | 7/1994 | Keith | 348/699 |
| 5,353,062 | 10/1994 | Maeda | 348/416 |
| 5,357,282 | 10/1994 | Lee | 348/403 |
| 5,369,438 | 11/1994 | Kim | 348/402 |
| 5,371,547 | 12/1994 | Siracusa et al. | 348/426 |
| 5,371,611 | 12/1994 | Kato et al. | 358/456 |
| 5,375,070 | 12/1994 | Hershey et al. | 364/550 |
| 5,386,232 | 1/1995 | Golin et al. | 348/391 |
| 5,408,269 | 4/1995 | Tsukagoshi | 348/412 |
| 5,410,553 | 4/1995 | Choon | 348/416 |
| 5,418,568 | 5/1995 | Keith | 348/699 |
| 5,446,492 | 8/1995 | Wolf et al. | 348/192 |
| 5,461,679 | 10/1995 | Normille et al. | 382/304 |
| 5,481,364 | 1/1996 | Ito | 358/261.1 |
| 5,481,727 | 1/1996 | Asano et al. | 364/242.91 |
| 5,488,419 | 1/1996 | Hui et al. | 348/402 |
| 5,502,493 | 3/1996 | Meyer | 348/426 |
| 5,510,840 | 4/1996 | Yonemitsu et al. | 348/402 |
| 5,523,847 | 6/1996 | Feig et al. | 358/261.3 |
| 5,543,846 | 8/1996 | Yagaski | 348/415 |
| 5,563,928 | 10/1996 | Rostoker et al. | 377/20 |

OTHER PUBLICATIONS

Dr. Richard Baker "Standards Dominate Videoconferencing Implementataions", Computer Design, Dec. 1994, pp. 66–70.

Stephen ohr"digital Video Spearheads TV and Videoconferencing Applications", Computer Design, Dec. 1994, 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb. 1994, pp. 1–11.

(List continued on next page.)

*Primary Examiner*—Tommy P. Chin
*Assistant Examiner*—Anand S. Rao
*Attorney, Agent, or Firm*—Skjerven, Morrill, MacPherson, Franklin & Friel LLP; Ken J. Koestner

[57] ABSTRACT

A method of adaptively performing motion compensation in a video processing apparatus is provided. The video processing apparatus processes macroblocks of compressed video information. Some of these macroblocks have motion vectors associated therewith. The method is conveniently implemented on a general purpose computer in one embodiment. In accordance with the disclosed method, the performance of the processor in the computer is monitored and a measurement of this performance is made. A threshold dependent on the measured processor performance is then set. For those macroblocks which have motion vectors associated therewith, the magnitude of the motion vector is determined. If the magnitude of the motion vector of a particular macroblock exceeds the threshold, then motion compensation is performed on that macroblock. However, if the magnitude of the motion vectors or motion vectors associated with a particular macroblock do not exceed the threshold, then no motion compensation is performed. The processor is thus relieved from the computational burden of performing motion compensation on a significant number of macroblocks.

6 Claims, 5 Drawing Sheets

OTHER PUBLICATIONS

Peng H. Ang, et al., "Video Compression Makes Big Gains", IEEE Spectrum, Oct. 1991, pp. 16–19.

Andy C. Hung, et al, "A Comparison of Fast Inverse Discrete Cosine Transform Algorithms", Multimedia Systems, ©1994, pp. 204–217.

P1180/D1, "Draft Standard Specification for the Implementations of 8×8 Inverse Descrete Cosine Transform", May, 29, 1990, pp. 1–9.

ISO/IEC 11172–1, Information Technology–Coding of Moving Pictures and Associated Audio for Digital Storage Media at up to about 1,5 Mbit/s —Part 1: Systems, Aug. 1, 1993, pp. i–vi, 1–53.

ISO/IEC 11172–2, Information Technology–Coding of Moving Pictures and Associated Audio for Digital Storage Media at up to about 1,5 Mbit/s –Part 1: Video, Aug. 1, 1993, pp. i–ix, 1–112.

ISO/IEC 11172–3, Information Technology–Coding of Moving Pictures and Associated Audio For Digital Storage Media at up to about 1,5 Mbit/s —Part 1: Audio, Aug. 1, 1993, pp. i–vi, 1–150.

Kevin L. Gong, et al., "Parallel MPEG–1 Video Encoding", Report, University of California, Berkeley, Computer Science Division, 1994, pp. 1–14.

METHOD AND APPARATUS FOR ADAPTIVELY PERFORMING MOTION COMPENSATION IN A VIDEO PROCESSING APPARATUS

CROSS REFERENCE TO RELATED PATENT APPLICATIONS

This patent application is related to the commonly assigned copending patent application entitled "SYSTEM FOR OPTIMIZING STORAGE OF VIDEO DATA ARRAYS IN MEMORY" by Rita O'Brien, (Ser. No. 08/423,769, filed on Apr. 18, 1995) the disclosure of which is incorporated herein by reference.

This patent application is also related to the commonly assigned copending patent application entitled "VIDEO DECODER APPARATUS USING NON-REFERENCE FRAME AS AN ADDITIONAL PREDICTION SOURCE AND METHOD THEREFOR" by Yi Liu, Michael R. Tucker and Geoffrey S. Strongin, (Ser. No. 08/424,037, filed Apr. 18, 1995) the disclosure of which is incorporated herein by reference.

This patent application is also related to the commonly assigned copending patent application entitled "METHOD OF PIXEL AVERAGING IN A VIDEO PROCESSING APPARATUS" by Geoffrey S. Strongin, Yi Liu and Michael R. Tucker, (Ser. No. 08/424,028, filed Apr. 18, 1995) the disclosure of which is incorporated herein by reference.

BACKGROUND OF THE INVENTION

1. Field of the Invention

The present invention relates to video processing and, more particularly, to motion compensation of compressed video information.

2. Description of Related Art

Because video information requires a large amount of storage space, video information is generally compressed. Accordingly, to display compressed video information which is stored, for example on a compact disk read only memory (CD ROM), the compressed video information must be decompressed to provide decompressed video information. The decompressed video information is then provided in a bit stream to a display. The bit stream of video information is typically stored in a plurality of memory storage locations corresponding to pixel locations on a display. The stored video information is generally referred to as a bit map. The video information required to present a single screen of information on a display is called a frame. A goal of many video systems is to quickly and efficiently decode compressed video information so as to provide motion video.

Standardization of recording media, devices and various aspects of data handling, such as video compression, is highly desirable for continued growth of this technology and its applications. One compression standard which has attained widespread use for compressing and decompressing video information is the Moving Pictures Expert Group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Frames within the MPEG standard are divided into 16×16 pixel macroblocks. Each macroblock includes six 8×8 blocks: four luminance (Y) blocks, one chrominance red ($C_r$) block and one chrominance blue ($C_b$) block. The luminance blocks correspond to sets of 8×8 pixels on a display and control the brightness of respective pixels. The chrominance blocks to a large extent control the colors for sets of four pixels. For each set of four pixels on the display, there is a single $C_r$ characteristic and a single $C_b$ characteristic.

For example, referring to FIG. 1, labeled prior art, a frame presented by a typical display includes 240 lines of video information in which each line has 352 pixels. Accordingly, a frame includes 240×352=84,480 pixel locations. Under the MPEG standard, this frame of video includes 44 by 30 luminance blocks or 1320 blocks of luminance video information. Additionally, because each macroblock of information also includes two corresponding chrominance blocks, each frame of video information also includes 330 $C_r$ blocks and 330 $C_b$ blocks. Accordingly, each frame of video information requires 126,720 pixels=1,013,760 bits of bit mapped storage space for presentation on a display.

There are three types of frames of video information which are defined by the MPEG standard, intra-frames (I frame), forward predicted frames (P frame) and bidirectional-predicted frames (B frame). A sample frame sequence is depicted in FIG. 2, labelled prior art, which represents one of but many possible frame sequences supported by the MPEG standard.

An I frame, such as I frame 20, is encoded as a single image having no reference to any past or future frame (with one minor exception not important for this discussion). Each block of an I frame is encoded independently. Accordingly, when decoding an I frame, no motion processing is necessary. However, for the reasons discussed below, it is necessary to store and access I frames for use in decoding other types of frames.

A P frame, such as P-frame 24, is encoded relative to a past reference frame. A reference frame is a P or I frame. The past reference frame is the closest preceding reference frame. For example, P-frame 24 is shown as referring back to I-frame 20 by reference arrow 29, and thus, I-frame 20 is the past reference frame for P-frame 24. P-frame 28 is shown as referring back to P-frame 24 by reference arrow 30, and thus, P-frame 24 is the past reference frame for P-frame 28. Each macroblock in a P frame can be encoded either as an I macroblock or as a P macroblock. A P macroblock references a 16×16 area of a past reference frame, which may be offset by a motion vector, to which 16×16 motion-compensated area an error term is added (which, of course, may be zero for a given macroblock). The motion vector is also encoded which specifies the relative position of a macroblock within a reference frame with respect to the macroblock within the current frame. When decoding a P frame, the current P macroblock is formed by adding a 16×16 area from the reference frame to blocks of error terms.

B frames are frames which occur between two reference frames. There may be multiple B frames between a pair of reference frames. B frame macroblocks may be predicted from the past reference frame, the future reference frame, or by interpolating (averaging) a macroblock in the past reference frame with a macroblock in the future reference frame.

In more detail, a B frame (e.g., B-frames 21, 22, 23, 25, 26, and 27) is encoded relative to the past reference frame and a future reference frame. The future reference frame is the closest proceeding reference frame (whereas the past reference frame is the closest preceding reference frame).

Accordingly, the decoding of a B-frame is similar to that of a P frame with the exception that a B frame motion vector may refer to areas in the future reference frame. For example, B-frame 22 is shown as referring back to I-frame 20 by reference arrow 31, and is also shown as referring forward to P-frame 24 by reference arrow 32. For macroblocks that use both past and future reference frames, the two 16×16 areas are averaged and then added to blocks of error terms. The macroblocks from each of the reference frames are offset according to respective motion vectors.

Frames are coded using a discrete cosine transform (DCT) coding scheme which encodes coefficients as an amplitude of a specific cosine basis function. The DCT coefficients are quantized and further coded using variable length encoding. Variable length coding (VLC) is a statistical coding technique that assigns codewords to values to be encoded. Values having a high frequency of occurrence are assigned short codewords, and those having infrequent occurrence are assigned long codewords. On the average, the more frequent shorter codewords dominate so that the code string is shorter than the original data.

A variety of MPEG frame sequences are possible in addition to that shown (I-B-B-B-P-B-B-B-P-B-B-B-P-B-B-B-I- . . . ) in FIG. 2. Possible alternate sequences include: I-P-P-P-I-P-P-P-I-P-P-P- . . . ; I-B-B-P-B-B-P-B-B-I- . . . ; I-I-I-I-I-I- . . . (known as full motion JPEG); and others. Each choice trades off picture fidelity against compression density against computational complexity.

The above described scheme using I, P and B frames and motion vectors is often referred to as motion compensation. The error terms are coded via the discrete cosine transform (DCT), quantization, and variable-length coding (VLC). Motion compensation is one of the most computationally intensive operations in many common video decompression methods. When pixels change between video frames, this change is often due to predictable camera or subject motion. Thus, a macroblock of pixels in one frame can be obtained by translating a macroblock of pixels in a previous or subsequent frame. The amount of translation is referred to as the motion vector. A motion vector is typically a full pixel or half-pixel resolution. When a motion vector has half pixel resolution, an averaging procedure or method is used at each pixel of the previous (or subsequent) frame to compute the motion compensated pixel of the current frame which is to be displayed.

Moreover, as mentioned earlier, compression methods such as MPEG employ bi-directional motion compensation (B blocks) wherein a macroblock of pixels in the current frame is computed as the average or interpolation of a macroblock from a past reference frame and a macroblock from a future reference frame. Both averaging and interpolation are computationally intensive operations which require extensive processor resources. Averaging and interpolation severely burden the system processor when implemented in a general purpose computer system since these operations require many additions and divisions for each pixel to be displayed.

Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture. Consequently, a significant need exists for reducing the processing requirements associated with decompression methods. While such increased efficiencies are needed, it is important that the quality of the resulting video image not be overly degraded.

SUMMARY OF THE INVENTION

Conventional video decoders or decompressing systems typically decode a macroblock of a present P frame by performing motion compensation with a motion vector applied to a corresponding macroblock of a past reference frame. Such video decoders also decode a macroblock of a B frame by performing motion compensation with motion vectors applied to respective past and future reference frames.

It has been discovered that significant computational resources can be saved by providing motion compensation for macroblocks having an associated motion vector or motion vectors whose magnitude exceeds a predetermined threshold level and by turning off motion compensation for macroblocks for which the associated motion vector or motion vectors exhibit a magnitude which is less than the threshold.

In accordance with one embodiment of the present invention, a method is provided for motion compensation in a video processing system. The video processing system processes a compressed video data stream including a plurality of macroblocks of which some of the macroblocks have a motion vector associated therewith. The method includes the steps of selecting macroblocks in the compressed video data stream whose motion vectors exhibit a magnitude greater than a predetermined threshold value thus designating selected macroblocks. The method also includes the step of motion compensating the selected macroblocks whose motion vectors are greater than the predetermined threshold value. The remaining macroblocks whose motion vector or motion vectors do not exceed the threshold are not motion compensated. Thus, substantial computational overhead is desirably avoided.

In accordance with another embodiment of the method of the invention, a method of motion compensation is provided in a video processing system which processes a compressed video data stream including I, P and B macroblocks. The I macroblock has no motion vector associated therewith. The P macroblock has one motion vector associated therewith and the B macroblock has multiple motion vectors associated therewith. The method is conveniently implemented on a computer and includes the steps of determining a measure of the performance of the computer and selecting a threshold which is dependent on the performance of the computer. The method also includes the step of selecting P macroblocks in the compressed video data stream whose motion vectors exhibit a magnitude greater than the threshold thus designating selected P macroblocks and remaining P macroblocks. The method further includes the step of motion compensating the selected P macroblocks whose motion vectors are greater than the threshold. The remaining P macroblocks are not motion compensated thus relieving the computer from a significant computational burden. The method further includes the step of selecting B macroblocks in the compressed video data stream whose multiple motion vectors exhibit a magnitude greater than the threshold thus designating selected B macroblocks and remaining B macroblocks. The method also includes the step of motion compensating the selected B macroblocks whose multiple motion vectors are greater than the threshold. The remaining B macroblocks are not motion compensated thus relieving the computer from a significant computational burden.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
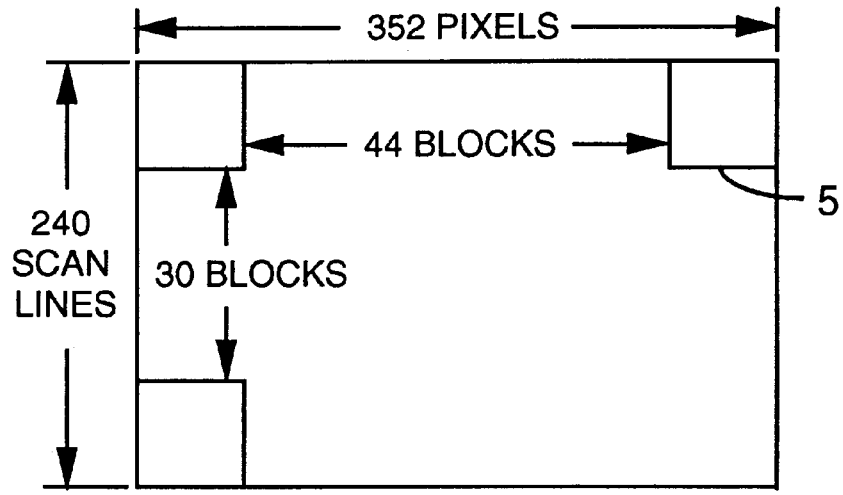
FIG. 1 is a representation of a typical MPEG macroblock.
Figure 2:
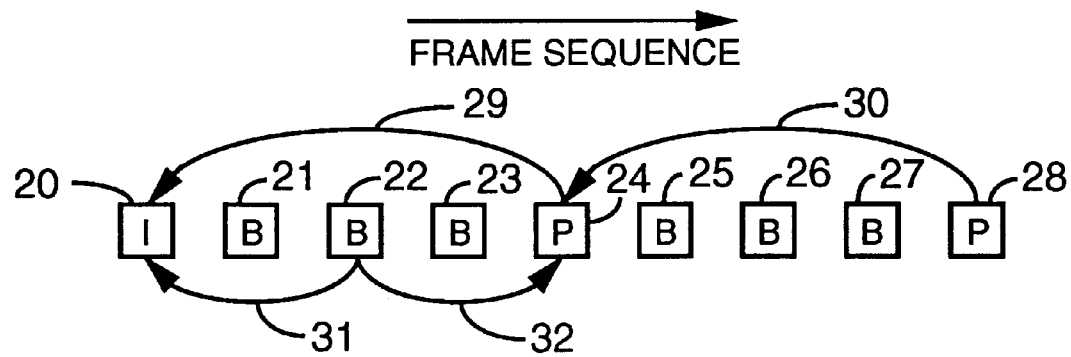
FIG. 2 is a typical prior art frame sequence consistent with the MPEG standard.

The frame buffer of a video decoding system is used to reconstruct each frame of a video image prior to display of the frame on a display. In one embodiment, a frame buffer used to build the current P frame or current B frame is initialized with pixel values already determined for the previous frame, rather than starting with a new frame buffer or with a frame buffer which has been cleared. More particularly, pixels for a given P macroblock within the current P frame, reuse the pixel values from a previous P or I frame if the magnitude of the motion vector associated with the P macroblock with the current P frame is less than a predetermined threshold value. When the current frame is a current B frame, pixels for a given B macroblock within the current B frame reuse the pixel values from a previous I or P or B frame if the magnitudes of the two motion vectors associated with the B macroblock within the current B frame are less than a predetermined threshold value.

A number of different methods can be used to perform the threshold test described above. For example, for a given P macroblock, the total magnitude of the motion vector can be resolved from the vector. The total magnitude of the motion vector is then tested against the predetermined threshold value to determine if this magnitude exceeds the predetermined threshold value. Alternatively, the AX and AY terms which form the motion vector are individually compared to the predetermined threshold value. If both the AX and AY terms exceed the predetermined threshold value (or if the magnitude of the motion vector itself exceeds the predetermined threshold), then motion compensation and error term correction are performed for this P macroblock using the motion vector to form the current P macroblock. Such motion compensation and error term correction is carried out in the manner called for by the MPEG specification. Otherwise, if the threshold is not exceeded, motion compensation is not employed for the current P macroblock, and the pixels of the corresponding macroblock in the previous I or P frame are employed instead for the current P macroblock.

In the case of a current B macroblock in a B frame each of the motion vectors associated with the current B macroblock are tested to determine if they exceed the predetermined threshold. In a manner similar to that discussed above, the magnitude of each motion vector is determined and compared with the predetermined threshold or the $\Delta X$ and $\Delta Y$ terms of each motion vector are compared with a predetermined threshold. If the threshold is exceeded, then motion compensation and error term correction is carried out for the current B macroblock. Such motion compensation and error term correction is carried out in the manner called for by the MPEG specification. However, if the predetermined threshold is not exceeded. then motion compensation is not carried out for the current B macroblock, but rather the pixels of the corresponding macroblock in the previous I, P or B frame are used as the pixels of the current B macroblock.

A system for decompressing video information as described above is shown schematically in FIG. 3. Video system 100 includes input stream decoding portion 105, motion decoder 110, adder 115, frame buffer 120, and display 125. Input stream decoder 105 receives a stream of compressed video information and provides blocks of staticly decompressed video information to adder 115. Motion decoding portion 110 receives motion information and provides motion-compensated pixels to adder 115. Adder 115 receives the staticly decompressed video information and the motion-compensated pixels and provides decompressed pixels to frame buffer 120, which then provides the information to display 125.

Input stream decoding portion 105 includes input buffer 130, variable length coding (VLC) decoder 135, inverse zig-zag and quantizer circuit 140 and inverse discrete cosine transform (IDCT) circuit 145. Motion decoding portion 110 includes previous picture store circuit 150, future picture store circuit 155, memory 160, motion vector magnitude determiner 165, comparator 170, forward motion compensation circuit 175, motion vector magnitude determiner 180, comparator 185, and backward motion compensation circuit 190. Current frame buffer 120 captures a display frame as it is decoded and assembled macroblock by macroblock, and allows information provided by adder 115 to be rasterized prior to display by display 125.

Input stream decoder 105 provides staticly decompressed pixels to adder 115 on a block by block basis. Additionally, forward motion compensation circuit 175 and backward motion compensation circuit 190 of motion decoder 110 provide motion-compensated pixel values to adder 115 on a macroblock by macroblock basis. Adder 115 provides pixel values to frame buffer 120 on a macroblock by macroblock basis until a frame is completed, which is then provided to previous picture store circuit 150 (in the case of an I or P past reference frame) and to future picture store circuit 155 (in the case of an I or P future reference frame).

In operation, input buffer 130 receives a compressed video signal from a video signal source such as a CD ROM (not shown); the compressed video signal is provided as a stream of compressed video information. Input buffer 130 buffers this compressed video signal to compensate for the speed which the signal is provided by the video source. This buffered compressed video signal is provided to VLC decoder 135 which decodes the variable length coded portion of the compressed signal to provide a variable length decoded signal to inverse zig-zag and quantizer circuit 140 which decodes the variable length decoded signal to provide a zig-zag decoded signal. The inverse zig-zag and quantization compensates for the fact that while a compressed video signal is compressed in a zig-zag run-length code fashion, the zig-zag decoded signal is provided to inverse DCT circuit 145 as sequential blocks of information. Accordingly, this zig-zag decoded signal provides blocks which are in the order required for raster scanning across display 125. This zig-zag decoded signal is then provided to inverse DCT circuit 145 which performs an inverse discrete cosine transform on the zig-zag decoded video signal on a block by block basis to provide staticly decompressed pixel values or decompressed error terms.

The staticly decompressed pixel values are provided to adder 115 and, if the block does not belong to a predicted macroblock (for example, in the case of an I macroblock), then these pixel values are provided unchanged to frame buffer 120. However, for the predicted macroblocks (for example, B macroblocks and P macroblocks), adder 115 adds the decompressed error to the forward motion compensation and backward motion compensation outputs from motion decoder 110 to generate the pixel values which are provided to frame buffer 115 and then to display 125. More specifically, forward motion vectors are used to translate pixels in previous picture store circuit 150 and backward motion vectors are used to translate pixels in future picture store circuit 155 and this information is compensated by the decompressed error term provided by inverse DCT circuit 145.

For an I frame, on which no motion compensation is performed, the inverse DCT output provides the pixel values directly for each macroblock, which are transmitted through adder 115 to frame buffer 120 (for display), and which are also provided to previous picture store circuit 150. Previous picture store circuit 150 stores the blocks of video information in memory 160 for access in performing motion compensation on future frames of video information.

If the macroblock is a P macroblock in a P frame and if the predetermined threshold is exceeded by the magnitude of the motion vector of this P macroblock, then motion compensation is performed by motion decoder 110. More specifically, previous frame information is accessed from memory 160 via previous picture store circuit 150. The previous picture information is then forward motion compensated by forward motion compensation circuit 175 to provide a forward motion-compensated block of pixel values. Then the error terms provided by inverse DCT circuit 145 are added with the forward motion-compensated pixel values to provide a P macroblock of the P frame. The I macroblocks in the P frame are generated as the macroblocks in an I frame. After all macroblocks are computed, the P frame in current frame buffer 120 is both transferred to display 125 and to memory 160 via future picture store circuit 155 for future use.

It is noted that motion vector magnitude determiner or decoder 165 determines the magnitude of the motion vector of a P macroblock in the above motion compensating technique. Comparator 170 determines if the magnitude of the motion vector exceeds a predetermined threshold value.

If the macroblock is a B macroblock in a B frame and if the predetermined threshold is exceeded by the magnitudes of the motion vectors of this B macroblock, then motion compensation is performed by motion decoder 110. More specifically, previous picture information and future picture information is accessed from memory 160 via previous picture store circuit 150 and future picture store circuit 155. The previous picture information is then forward motion compensated by forward motion compensation circuit 175 to provide a forward motion-compensated pixel macroblock. Additionally, the future picture information is backward motion compensated by backward motion compensation circuit 190 to provide a backward motion-compensated pixel macroblock. The averaging of these two macroblocks yields a bidirectional motion compensated macroblock. Next, error terms which are provided by inverse DCT circuit 145 are added to the bidirectional motion-compensated pixel macroblock to provide a macroblock of pixel values for the B frame, which is then stored within frame buffer 120 as a macroblock. The P and I macroblocks in the B frame are computed as discussed above for the I frame and the P frame. After all macroblocks are computed, the completed B frame is transferred from current frame buffer 120 to display 125.

If the macroblock is a P macroblock in a B frame and if the predetermined threshold is exceeded by the magnitude of the motion vector of this P macroblock, then motion compensation is performed by motion decoder 110.

It is noted that motion vector magnitude determining circuit 165 and motion vector magnitude determining circuit 180 determine the magnitudes of the respective motion vectors of a B macroblock. The motion vectors are decoded from the video stream. More specifically, motion vectors are generated by VLC decoder 135. Comparator 170 determines if the magnitude of the motion vector of the current B macroblock with respect to the previous picture information exceeds a predetermined threshold value. Comparator 185 determines if the magnitude of the motion vector of the current B macroblock with respect to the future picture information exceeds a predetermined threshold value. If the predetermined threshold value is exceeded in both cases, then forward motion compensation and backward motion compensation are carried out by forward motion compensating circuit and backward motion compensating circuit 190, respectively. However, if the threshold is not exceeded in both tests by comparators 170 and 185, then the values used for the corresponding macroblock in the last frame are used for the current macroblock in the current frame.

It has been found by experimentation that acceptable threshold levels are within the range of approximately 2 pixels to approximately pixels 3, although values outside of this range can also be used according to the particular application. Thus, in an embodiment wherein the threshold is set at 2 and the magnitude of a particular macroblock's motion vector is found to be 3, then motion compensation will be carried out for that macroblock. However, if the magnitude of the motion vector of this macroblock were found to be equal to 2 or less, then motion compensation would not be carried out for this particular macroblock. Rather, the values for the pixels of this macroblock in the last frame would be used again. Significant computational overhead is thus avoided in video systems employing this methodology. Unlike other video systems wherein motion compensation is carried out for every P and B macroblock, the disclosed embodiment advantageously avoids the computationally intensive task of motion compensation in many P and B macroblocks.

It is noted that in accordance with one embodiment, the video system which is generally implemented in software monitors the performance of the host processor on which it is installed. The threshold level is adaptively selected according to the computing power available on the host processor. If the video system is installed in a high performance host processor, then the threshold level is reduced to a lower level, for example, 2. In this case, the magnitude of the motion vectors will exceed the threshold level more easily such that more P and B macroblocks are motion compensated. However, if the video system is installed in a low performance host processor, then the threshold level is increased to a higher level, for example, 3. In this case, the magnitude of the motion vectors will exceed the threshold level less often such that fewer P and B macroblocks are motion compensated. The video quality seen at the display will be somewhat reduced, however a lesser computational burden is presented to the lower performance host processor.

It should be noted that the above threshold levels are given for example purposes only and that they should not be taken as being limiting. These threshold levels will vary according to the particular application. It is also noted that one embodiment of the video system is an adaptive system which dynamically compensates for changes in a particular processor's performance is it handles multiple tasks. At those times when the host processor is burdened by several tasks, the processor will be perceived as a lower performance, or more burdened, processor and the threshold will be increased such that fewer P and B macroblocks are motion compensated. However, at times when the process is performing fewer tasks and is less burdened, the processor will be perceived as a higher performance, or less burdened, processor and the threshold will be decreased such that more P and B macro blocks are motion compensated. In another embodiment of the video system, the threshold is set according to a fixed measure of processor performance such as clock speed, bus speed or some other value which is fixed within a particular host processor. It is noted that even in this case, when the video system is installed on different host processors with different clock speeds, the video system will perceive the different clock speeds and adjust the predetermined threshold accordingly.

Figure 3:
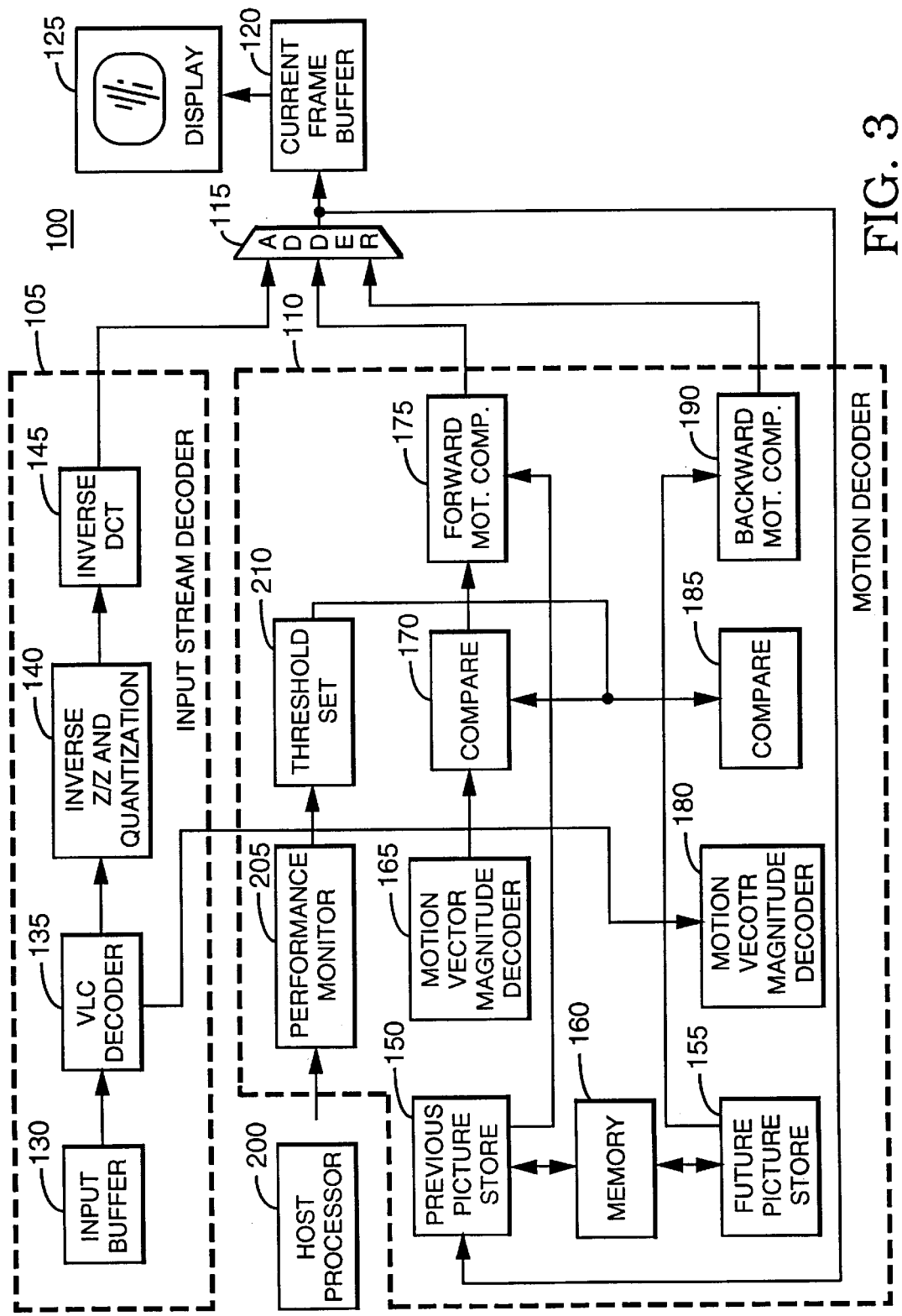
FIG. 3 shows one embodiment of the disclosed system for decompressing video information.

As seen in FIG. 3, video system 100 includes a performance monitor 205 which receives performance information from the host processor 200. (In actual practice, most of video system 100 is implemented within host processor although for purposes of illustration, host processor 200 is shown separately in FIG. 3). Performance monitor 205 makes a determination of the performance capabilities of the host processor. For example, monitor 205 determines if host processor 200 is a low, medium or high performance processor. Alternatively, monitor 205 determines other grades of performance as well or a continuum of performance levels.

Video system 100 also includes a threshold set 210 which sets the threshold depending on the particular level of performance which is determined by performance monitor 205. If performance monitor 205 finds that host processor 200 is capable of high performance, then threshold set 210 sets the threshold at a relatively low level to provide more motion compensation. However, if performance monitor 210 determines that host processor 200 is presently capable of only low performance, then threshold set 210 sets the threshold at a relatively high level to reduce motion compensation burdens. As seen in FIG. 210, threshold set 210 provides the threshold to comparators 170 and 175 which determine if the magnitude of the aforementioned motion vectors exceed the threshold.

Figure 4A:
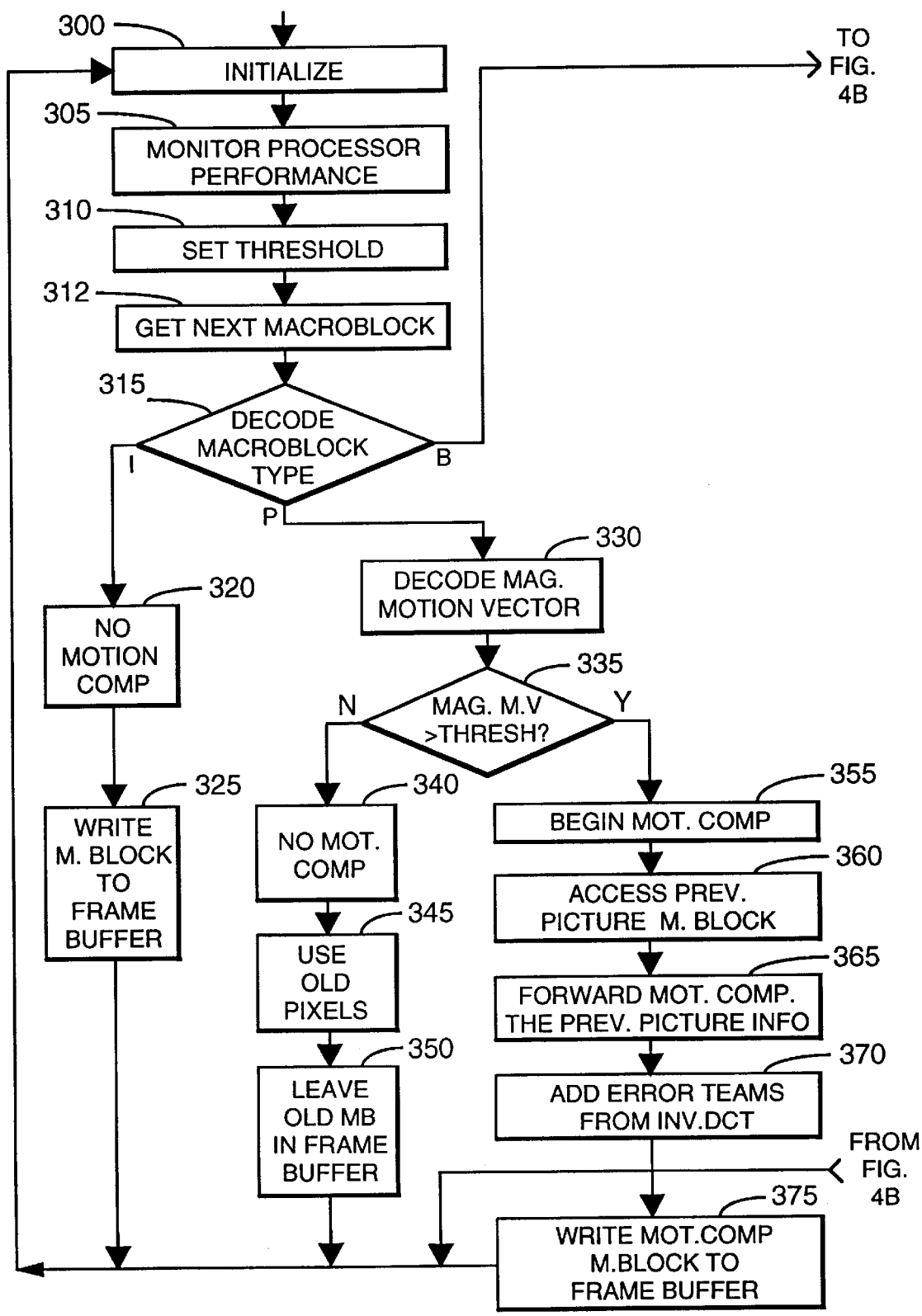
FIG. 4 is a flowchart depicting the flow of operations within the video system of FIG. 3.
Figure 4B:
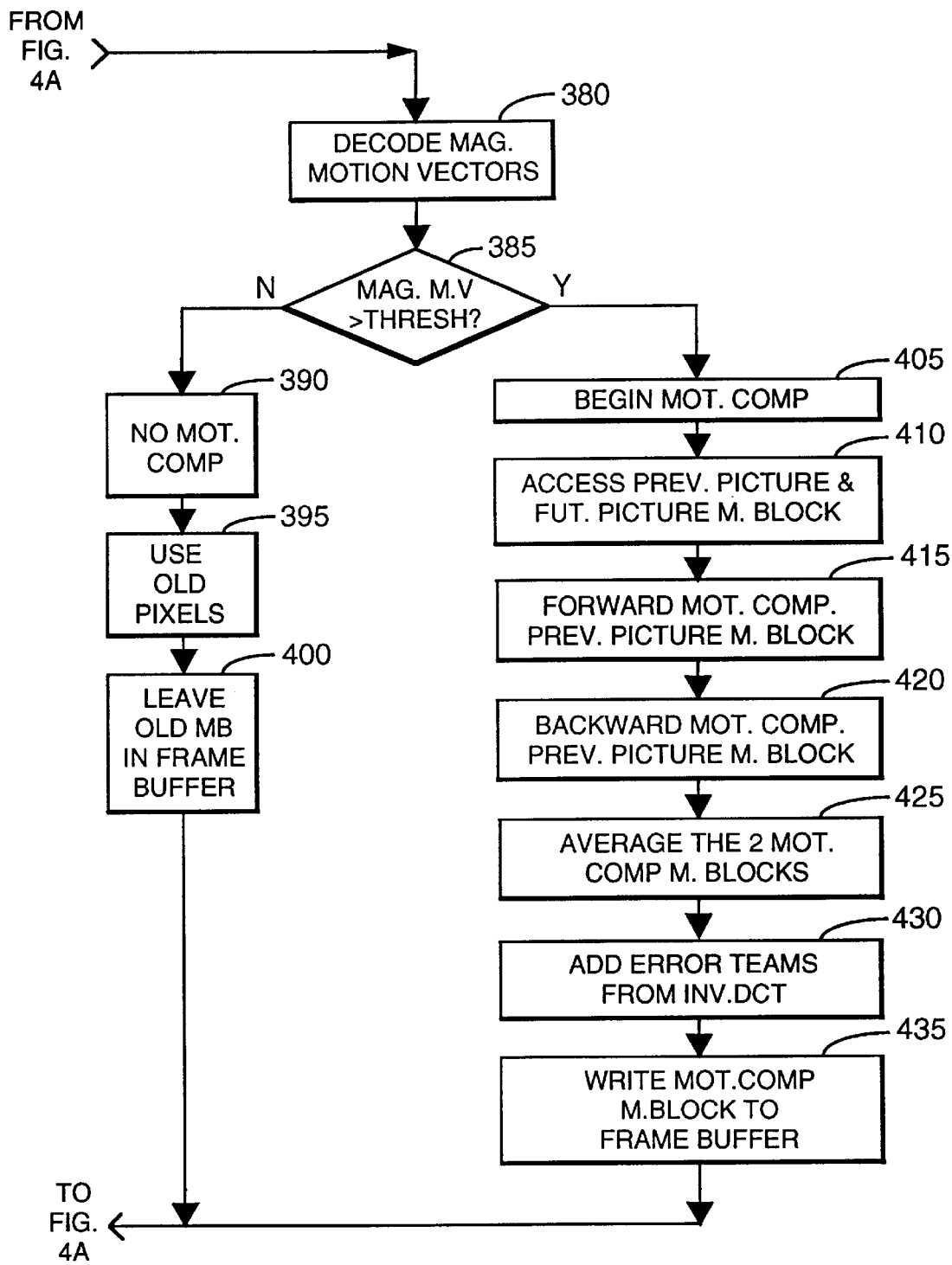

It should be noted that while video system 100 can be implemented in hardware, it is preferable to implement video system 100 in software. The following flow chart of FIG. 4 shows the operation of a software embodiment of video system 100. This flow chart is generally applicable to a hardware embodiment as well.

The video system is initialized as indicated at block 300. The system then monitors the performance of the processor in which the system is implemented as per block 305. This performance monitoring can include checking the clock speed of the processor, checking the bus speed associated with the processor, performing benchmark testing on present processor performance, checking the desired frame rate vs. the actual achieved frame rate or other performance testing. Depending on the level of performance detected in the testing step of block 305, the threshold is set in block 310. The threshold is set to a relatively high level if the performance of processor is presently gauged to be relatively low, and conversely, the threshold is set to a relatively low level if the performance of the processor is gauged to be relatively high. It is possible for the threshold to be set to a constant level for all operation of a particular system each time the system is initialized, or alternatively, the method can check present system performance each time through the flowchart loop depicted in FIG. 4. In other words, the threshold can be set to a static value once system performance is determined, or can vary dynamically with changes in current system performance which occur as the system becomes loaded with tasks and then relieved of such tasks.

It should be understood that the system processes macroblock after macroblock in a frame. The system retrieves a macroblock in a frame as per block 312. This macroblock is referred to as the current macroblock. The current macroblock can be an I, P or B macroblock. It will be recalled that an I macroblock depends on no other macroblock in the past or future. A P macroblock depends on a macroblock in a past I or P frame. A B macroblock can depend on macroblocks in both a past and a future I or P frame. The system decodes the type of the current macroblock in "macroblock type determining" block 315.

If the current macroblock of a frame is determined to be an I macroblock, then no motion compensation is implemented as per block 320. Process flow continues to block 325 where the current I macroblock is written to frame buffer 120.

If the current macroblock of a frame is determined to be a P macroblock, then the magnitude of the motion vector associated with the P macroblock is decoded as per block 330. A test is then conducted at decision block 335 to determine if the magnitude of the motion vector exceeds the predetermined threshold value. If the magnitude of the motion vector does not exceed the threshold value, then no motion compensation is implemented as indicated in block 340. The pixels in the corresponding macroblock of the prior I or P frame are reused as per block 345 and the pixels from such prior macroblock are left in the frame buffer at the location for the current P macroblock as per block 350. Process flow then continues back to block 305 where processor performance monitoring continues and the threshold is again set at block 310. This implements dynamic performance checking. Alternatively, process flow can continue directly back to block 312 where the next macroblock is accessed if an implementation of static performance monitoring is desired.

However, if the magnitude of the motion vector of the current P macroblock exceeds the threshold, then the system begins to carry out motion compensation as indicated in block 355. The previous I or P picture macroblock on which the current P macroblock depends is accessed in block 360. Forward motion compensation is then implemented on the previous picture macroblock using the motion vector of the current P macroblock as indicated in block 365. Error terms from the inverse discrete cosine transform (DCT) 145 are then added to the motion compensated macroblock as per block 370. The resultant motion compensated macroblock is then written to the frame buffer as per block 375. Process flow then continues back to block 305 where processor performance is again monitored.

If the current macroblock type is decoded to be a B macroblock at decision block 315, then a decoding is conducted at block 380 as to the magnitude of the two motion vectors associated with this current B macroblock. If neither of these motion vectors exceeds the threshold in testing block 385, then no motion compensation is carried out as indicated by block 390. The corresponding macroblock of pixels in the prior I or P frame on which the current B block depends are reused as per block 395 and the pixels from such prior macroblock are left in the frame buffer at the location for the current B macroblock as per block 400. Process flow then continues back to block 305 where processor performance monitoring continues and the threshold is again set at block 310.

However, if the magnitude of the motion vectors of the current B macroblock exceed the threshold, then the system begins to carry out motion compensation as indicated in block 405. The macroblock in the previous I or P frame and the macroblocks in the I or P frame on which the current B macroblock depends are accessed in block 410. Forward motion compensation is then implemented on the previous picture macroblock using the appropriate motion vector of the current B macroblock as indicated in block 415. Backward motion compensation is also then implemented on the future picture macroblock using the appropriate motion vector of the current B macroblock as indicated in block 420. The motion compensated macroblock resulting from the previous picture macroblock is then averaged with the motion compensated macroblock resulting from the future picture macroblock to produce an averaged motion compensated macroblock as per block 425. Error terms from the inverse discrete cosine transform (DCT) 145 are then added to the averaged motion compensated macroblock as per block 430. The resultant motion compensated macroblock is then written to the frame buffer as per block 435. Process flow then continues back to block 305 where processor performance is again monitored.

Figure 5:
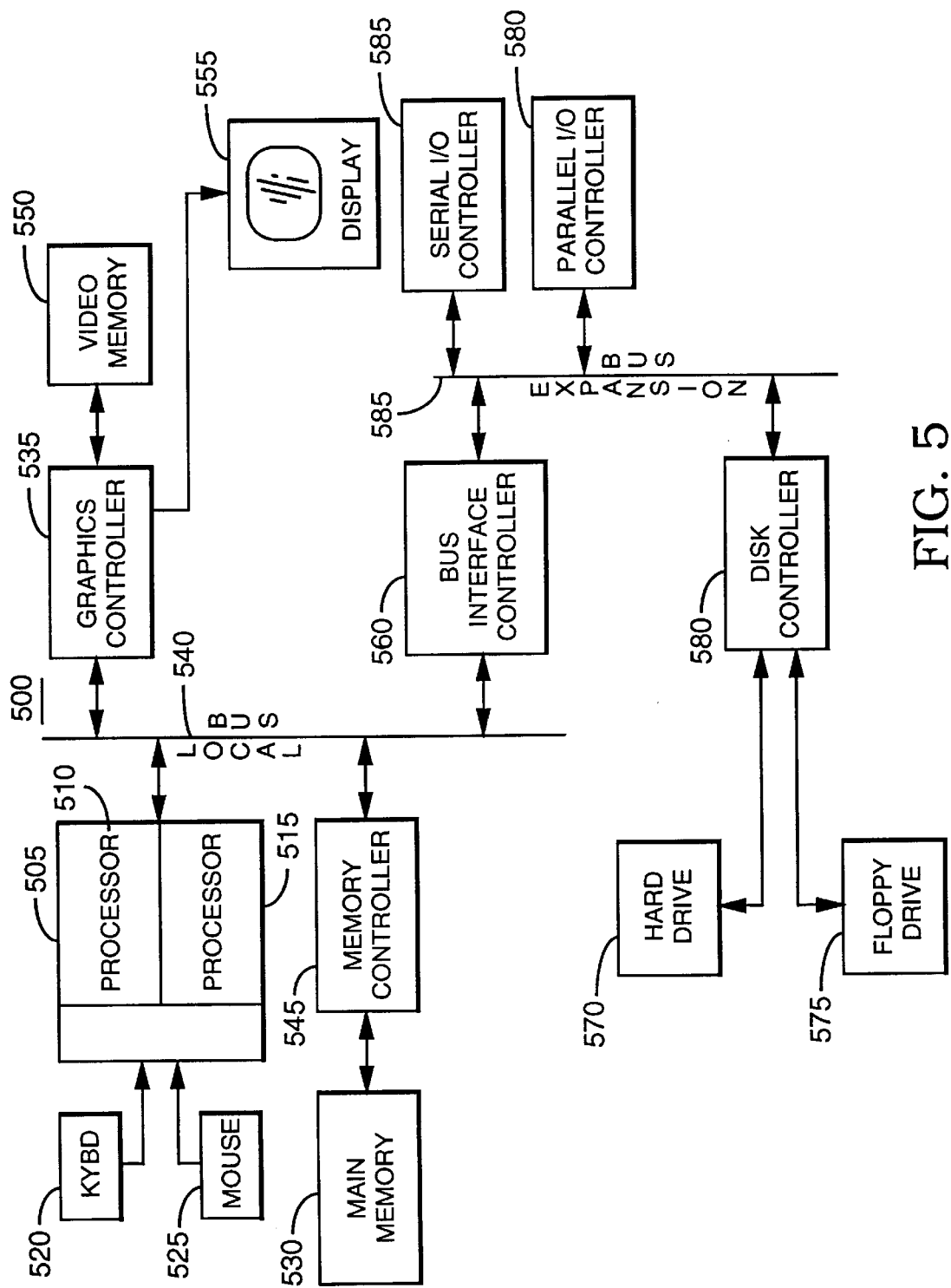
FIG. 5 is a block diagram of a computer on which the disclosed method can be implemented.

FIG. 5 shows a typical computer apparatus 500 on which the disclosed method of adaptively performing motion compensation is implemented. While the computer apparatus 500 of FIG. 5 is a general purpose computer, it will be appreciated that custom hardware can also be employed for implementing the disclosed motion compensation method.

Computer apparatus 500 includes a microprocessor 505 having a processor 510 for processing integer instructions and a coprocessor 515 for processing floating point instructions. In this particular embodiment, microprocessor 505 is an X86 microprocessor, although other types of microprocessors such as RISC microprocessors can also be used. A keyboard 520 and mouse pointing device 525 are coupled to microprocessor 505 to provide input to the microprocessor. Main memory 530 and a graphics controller 535 reside on a common local bus 540 which is coupled to microprocessor 505. More specifically, a memory controller 545 couples main memory 530 to local bus 540. A video memory 550 and display 555 are coupled to graphics controller 535 to enable graphics and video images to be transmitted to display 555.

A bus interface controller 560 couples local bus 540 to expansion bus 565. Expansion bus 565 is a Peripheral Component Interconnect (PCI) bus, an Industry Standard Architecture (ISA) bus, or other bus architecture, if desired. A hard drive 570 and a floppy drive 575 are coupled by a disk controller 580 to expansion bus 565 as shown. A serial I/O controller 585 and a parallel I/O controller 590 are coupled to expansion bus 565 to permit the coupling of external serial and parallel devices to computer 500.

The foregoing has disclosed a method of adaptively performing motion compensation in a video processing apparatus. The disclosed method advantageously reduces the processing requirements associated with decompression methodology. Accordingly, decompression efficiency is increased while not overly degrading the ultimate video image.

While only certain preferred features of the invention have been shown by way of illustration, many modifications and changes will occur. It is, therefore, to be understood that the present claims are intended to cover all such modifications and changes which fall within the true spirit of the invention.

We claim:

1. A method of motion compensation in a video processing system which processes a compressed video data stream including a plurality of macroblocks of which some of the macroblocks have a motion vector associated therewith, the method being implemented in a computer, the method comprising the steps of:

determining a measure of the performance of the computer including a substep selected from a group including the substeps of:
checking a clock speed of the computer;
checking a bus speed associated with the computer;
benchmark testing performance of the computer; and
checking a desired frame rate against an actual achieved frame rate;

selecting a threshold which is dependent on performance determined in the determining step;

selecting macroblocks in the compressed video data stream whose motion vectors exhibit a magnitude greater than the threshold thus designating selected macroblocks and remaining macroblocks; and motion compensating the selected macroblocks whose motion vectors are greater than the threshold, the remaining macroblocks not being motion compensated thus relieving the computer from a computational burden.

2. A method of motion compensation in a video processing system which processes a compressed video data stream including a plurality of macroblocks of which some of the macroblocks have a motion vector associated therewith, the method being implemented in a computer, the method comprising the steps of:

determining a measure of the performance of the computer including a substep selected from a group including the substeps of:
checking a clock speed of the computer;
checking a bus speed associated with the computer;
benchmark testing performance of the computer; and
checking a desired frame rate against an actual achieved frame rate;

selecting a threshold which is dependent on the performance determined in the determining step;

testing a macroblock, N, in the video data stream to determine if a motion vector associated with the first macroblock exhibits a magnitude greater than the threshold, motion compensating macroblock N if the motion vector associated with macroblock N is greater than the threshold, otherwise not motion compensating macroblock N to relieve the computer from a computational burden, repeating the determining, selecting, testing and motion compensating steps on subsequent macroblocks N+1, N+2, . . . such that motion compensation is performed on the subsequent macroblocks dependent on a threshold which varies dynamically with present computer performance.

3. A video processing system comprising:

a processor; and a motion compensation apparatus including:

an input stream decoder for generating a compressed video data stream including a plurality of macroblocks of which some of the macroblocks have an associated motion vector;

a processor performance monitor for predetermining a threshold value as a function of a measure of performance of a processor in the video processing system, the processor performance monitor including a monitor selected from a group of monitors including:

a processor clock speed monitor;

a processor bus speed monitor;

a processor benchmark testing monitor; and a frame rate monitor;

a comparator coupled to the input stream decoder and coupled to the processor performance monitor for selecting macroblocks in the compressed video data stream having motion vectors with a magnitude greater than the predetermined threshold value thus designating selected macroblocks; and a motion compensator coupled to the comparator for motion compensating the selected macroblocks having motion vectors that are greater than the threshold predetermined value.

4. A method of motion compensation in a video processing system which processes a compressed video data stream including I, P and B macroblocks, of which an I macroblock has no motion vector associated therewith, of which a P macroblock has a motion vector associated therewith, of which a B macroblock has multiple motion vectors associated therewith, the method being implemented in a computer, the method comprising the steps of:

determining a measure of performance of the computer including a substep selected from a group including the substeps of:

checking a clock speed of the computer;

checking a bus speed associated with the computer;

benchmark testing performance of the computer; and checking a desired frame rate against an actual achieved frame rate;

selecting a threshold which is dependent on the performance determined in the determining step;

selecting P macroblocks in the compressed video data stream whose motion vectors exhibit a magnitude greater than the threshold thus designating selected P macroblocks and remaining P macroblocks;

motion compensating the selected P macroblocks whose motion vectors are greater than the threshold, the remaining P macroblocks not being motion compensated thus relieving the computer from a computational burden, selecting B macroblocks in the compressed video data stream whose multiple motion vectors exhibit a magnitude greater than the threshold thus designating selected B macroblocks and remaining B macroblocks; and motion compensating the selected B macroblocks whose multiple motion vectors are greater than the threshold, the remaining B macroblocks not being motion compensated thus relieving the computer from a computational burden.

5. A video processing apparatus including a processor for processing a compressed video data stream including a plurality of macroblocks of which some of the macroblocks have a motion vector associated therewith, said video processing apparatus comprising:

a processor performance monitor for determining a measure of performance of the processor and for predetermining a threshold value based on the measure of performance, the processor performance monitor including a monitor selected from a group of monitors including:

a processor clock speed monitor;

a processor bus speed monitor;

a processor benchmark testing monitor; and a frame rate monitor;

a motion vector magnitude testing circuit for determining which macroblocks in the compressed video data stream have motion vectors exhibiting a magnitude greater than the predetermined threshold value thus designating selected macroblocks; and a motion compensation circuit, coupled to the motion vector magnitude determining circuit, for motion compensating the selected macroblocks whose motion vectors exhibit greater than the predetermined threshold value.

6. A video processing apparatus for processing a compressed video data stream including a plurality of macroblocks of which some of the macroblocks have a motion vector associated therewith, said video processing apparatus including a host processor, said video processing apparatus comprising:

a performance monitor for determining a measure of performance of the host processor, the processor performance monitor including a monitor selected from a group of monitors including:

a processor clock speed monitor;

a processor bus speed monitor;

a processor benchmark testing monitor; and a frame rate monitor;

a threshold setting circuit coupled to the performance monitor for setting a threshold which is dependent on the measure of performance determined by the performance monitor;

a motion vector magnitude testing circuit responsive to the compressed video data stream and coupled to the threshold setting circuit for determining which macroblocks in the compressed video data stream have motion vectors exhibiting a magnitude greater than the threshold value thus designating selected macroblocks, any remaining macroblocks being designated as remaining macroblocks; and a motion compensating circuit coupled to the motion vector magnitude testing circuit for motion compensating the selected macroblocks whose motion vectors exhibit a magnitude greater than the threshold value, the remaining macroblocks not being motion compensated thus relieving the host processor from a computational burden.

\* \* \* \* \*

UNITED STATES PATENT AND TRADEMARK OFFICE
CERTIFICATE OF CORRECTION

PATENT NO.    : 5,903,313
ISSUE DATE    : May 11, 1999
INVENTOR(S)   : Tucker, Michael R.; Strongin, Geoffrey S.; Liu, Yi It is certified that error appears in the above-identified patent and that said Letters Patent is hereby corrected as shown below:

Column 1, line 12; please insert --, now abandoned in favor of Serial No. 09/016,874, filed January 30, 1998,-- after "(Serial No. 08/423,769, filed April 18, 1995)";

Column 1, line 20; please insert --, and issued March 3, 1998 as U.S. Patent No. 5,724,446,--after "(Serial No. 08/424,037, filed April 18, 1995)"; *and*

Column 10, line 8; please delete "operation" and insert --operations--.

Signed and Sealed this

Fifteenth Day of February, 2000

*Attest:*

Q. TODD DICKINSON

*Attesting Officer*          *Commissioner of Patents and Trademarks*